United States Patent [19]

Williamson

[11] Patent Number: 5,060,988
[45] Date of Patent: Oct. 29, 1991

[54] HYDRAULIC COUPLING

[75] Inventor: Nigel D. L. Williamson, Sheffield, England

[73] Assignee: NWD International, Inc., Fort Wayne, Ind.

[21] Appl. No.: 520,216

[22] Filed: May 8, 1990

[51] Int. Cl.⁵ ............................................. F16L 25/00
[52] U.S. Cl. .................................. 285/332.3; 285/354
[58] Field of Search .................. 285/332.2, 332.3, 354

[56] References Cited

U.S. PATENT DOCUMENTS

| | | |
|---|---|---|
| 1,301,245 | 4/1919 | Fox . |
| 2,330,864 | 10/1943 | Bruno .............................. 285/354 X |
| 2,381,829 | 8/1945 | Livers ..................................... 285/86 |
| 2,775,471 | 12/1956 | Douglass ............................. 285/332 |
| 3,291,442 | 12/1966 | Cranage ............................ 251/149.1 |
| 3,807,773 | 4/1974 | Brune .............................. 285/354 X |
| 4,458,926 | 7/1984 | Williamson ....................... 285/332.3 |
| 4,802,695 | 2/1989 | Weinhold ..................... 285/332.3 X |

FOREIGN PATENT DOCUMENTS

| | | | |
|---|---|---|---|
| 3147050 | 6/1983 | Fed. Rep. of Germany ...... 285/354 |
| 889819 | 1/1943 | France .............................. 285/332.3 |
| 1141975 | 9/1957 | France . |

*Primary Examiner*—Dave W. Arola
*Attorney, Agent, or Firm*—Jeffers, Hoffman & Niewyk

[57] ABSTRACT

The invention is an improved hydraulic coupling wherein the male and female fittings include complementary tapered surfaces and the male fitting is axially urged into engagement with the female fitting by means of a threaded nut. The male fitting is provided with a shoulder behind its tapered surface and abuts a surface on the female member to thereby limit the axial movement of the male member and prevent nose collapse.

7 Claims, 1 Drawing Sheet

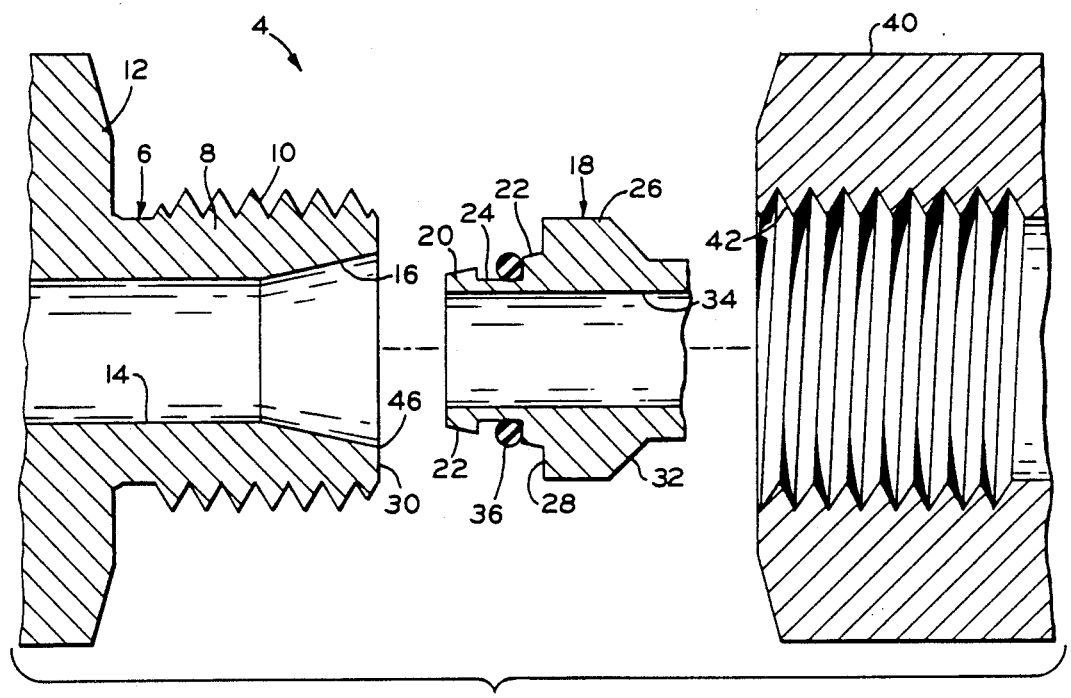
FIG_1
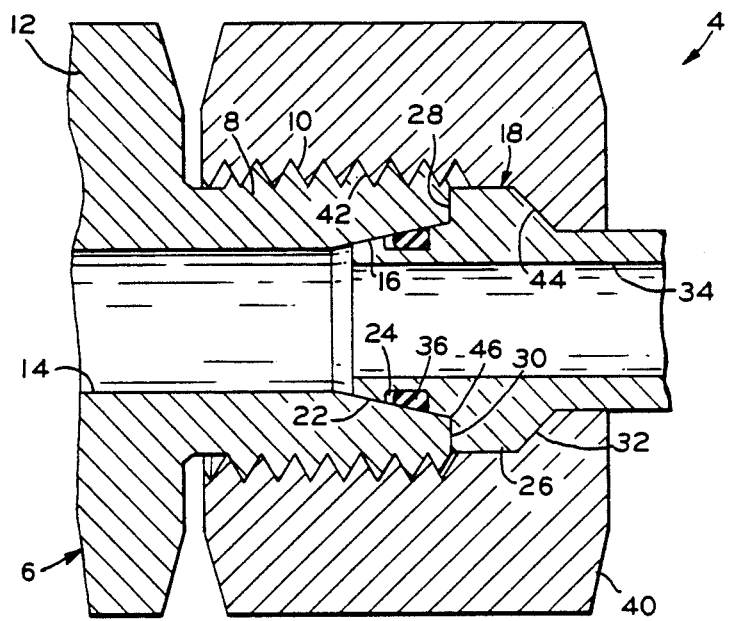
FIG_2

HYDRAULIC COUPLING

BACKGROUND OF THE INVENTION

The present invention relates to a hydraulic coupling for interconnecting hydraulic hoses or connecting hoses to various hydraulic fittings, such as adapters and the like.

A commonly used fitting, particularly in European countries, comprises a body having a threaded portion with a bore and an internal tapered seat. A fitting, which is adapted to be connected to a pipe or tubing, for example, is provided with a forwardly facing tapered external surface having a groove therein and an O-ring disposed within the groove. The fitting also includes a rearwardly facing shoulder which is engaged by a shoulder on a nut that encloses the fitting and is threadedly connected to the threaded portion of the body. As the nut is tightened on the threaded portion of the body, the fitting is advanced forwardly against the internal tapered seat and the O-ring is compressed to thereby form a fluid-tight seal.

A problem with this type of prior art fitting involves "nose collapse", which occurs when the externally tapered male fitting is driven down, under heavy torque, inside the tapered internal seat. The collapse of the nose of the male fitting is directly related to the amount of the linear travel of the fitting once engaged with the female tapered surface as a trigonometric function of the angle of the taper. In such European style fittings, the taper is typically 12° relative to the axis, although there is also a 30° configuration.

If the installer tightens the fitting beyond the point where the tapered surfaces meet and the O-ring is compressed, the annular portion of the male fitting in the area of the groove and O-ring will be collapsed inwardly, thereby damaging the fitting and thereby restricting the flow of the fluid medium.

SUMMARY OF THE INVENTION

The present invention constitutes an improvement to the aforementioned European type fitting wherein the problem of nose collapse is eliminated. The male fitting member is provided with a shoulder located behind the external tapered surface, which shoulder functions as a stop surface and abuts an abutment surface on the body portion of the coupling body that is in axial alignment with the shoulder. The shoulder is located dimensionally relative to the external tapered surface such that the shoulder will abut the leading edge of the coupling body just beyond the point where the tapered surfaces contact each other. Thus, the axial movement of the male fitting will be terminated at this point so that collapse of the nose portion thereof is avoided.

The present invention, in one form thereof, is a hydraulic coupling that comprises a female fitting having a central bore, an internal tapered surface and external threads. A male fitting is received within the female member and has a central bore coaxial with the bore of the female member, an external tapered surface complementary to the female tapered surface and an annular groove in the male tapered locking surface. An O-ring of deformable material is disposed in the groove. The male fitting member includes a flange portion located immediately behind the external tapered surface having a diameter greater than the outer diameter of the external tapered surface to define a stop shoulder facing the abutment surface of the female fitting. The male member may further comprise a second shoulder located behind the stop shoulder and facing in an opposite direction. A nut member is threadedly connected to the female member and engages the rearwardly facing shoulder of the male member to thereby force the tapered surfaces together and deform the O-ring. The stop shoulder is in abutment with the female member abutment surface to thereby limit the travel of the male member within the female member and prevent collapse of the nose portion of the male member.

An advantage of the present invention is that the nose portion of the male fitting is protected against nose collapse without the necessity for modifying the standard nut and female component of the coupling.

BRIEF DESCRIPTION OF THE DRAWINGS

The above mentioned and other features and advantages of the invention will become more apparent and the invention itself will be better understood by reference to the following description of an embodiment of the invention taken in conjunction with the accompanying drawings, wherein:

FIG. 1 is an exploded, sectional view of the hydraulic coupling according to the present invention; and FIG. 2 is a sectional view of the assembled coupling.

Corresponding reference characters indicate corresponding parts throughout the views. The exemplification set out herein illustrate a preferred embodiment of the invention and such exemplifications are not to be construed as limiting the scope of the disclosure or the scope of the invention in any manner.

DETAILED OF THE PREFERRED EMBODIMENT

The coupling 4 according to the present invention comprises a standard female member 6 having a threaded portion 8 with external threads 10 thereon and a flange portion 12. Threaded portion 8 and flange portion 12 include an internal bore 14 and an internally tapered seat 16 in communication with bore 14. Female member 6 is a standard body utilized in the aforementioned European-type coupling.

Male fitting 18 includes a tapered nose portion 20 having an externally tapered surface 22 with an annular groove 24 therein located approximately midway of the tapered surface 22. Surface 22 may be tapered at an angle of 12 relative to the axis, which is the identical taper of internal seat 16 and female member 6. A flange portion 26 is disposed immediately behind tapered surface 22 and defines a forwardly facing shoulder 28, which is in axial alignment with the leading edge abutment surface 30 of female member 6. Flange portion 28 further defines a rearwardly facing shoulder 32, which may be tapered as shown in the figures. Male fitting member includes an internal bore 34 in fluid communication with bore 14 when the coupling 4 is assembled. An O-ring 36 is disposed within groove 24 and extends above tapered surface 22. O-ring 36 may be formed of any suitable elastomeric or resilient rubber-like material conventionally used for making deformable O-rings used in hydraulic fittings.

Standard nut 40 includes internal threads 42 that are adapted to be threadedly engaged with external threads 10 of female member 6. Nut 40 is preferably formed with hexagonal flats on the exterior surface so that it can be tightened onto female member 6 by means of a wrench or other suitable tool.

FIG. 2 illustrates the manner in which the elements constituting hydraulic coupling 4 are assembled. Male fitting member 18, which is adapted to be connected to a tube or pipe, is initially received within nut 40 and nut 40 is then threaded onto the externally threaded portion 8 of female member 6. As nut 40 is turned, shoulder 44 thereon engages shoulder 32 of male member 18 and urges it forwardly toward female member 6 whereupon tapered surface 16 deforms O-ring 36 to form a liquid-tight seal between male fitting 18 and female fitting 6. As nut 40 continues to be advanced, eventually tapered surfaces 22 and 16 move into radial abutment. If stop shoulder 28 were not provided, as is the case with prior art couplings of this type, continued advancement of nut 40 would drive tapered nose portion 20 further into the bore defined by internal tapered surface 16, thereby possibly causing collapse of the nose portion 20 of male member 18. However, in accordance with the present invention, stop shoulder 28 will abut surface 30 on female member 6 before this can occur, thereby limiting the extent of axial travel of male member 18 and permitting nut 40 to be tightened on female member 6 without damage to male fitting 18.

However, to ensure that there is a tight seal and a certain amount of frictional locking between tapered surfaces 16 and 22, stop shoulder 28 is dimensioned so that there is a slight gap between it and leading edge 30 at the time that an interference fit between surfaces 16 and 22 occurs without the application of any torque, that is, when the breakout diameter 46 of female member 6 just contacts tapered surface 22 on male fitting 18. This gap is preferably in the range of 0.005 inches (0.127 mm) to 0.100 inches (2.54 mm). Further advancement of male member 18 to close this gap until surfaces 28 and 30 abut will cause the proper amount of frictional engagement between tapered surfaces 16 and 22. No further movement is possible even when excess torque is applied because the abutting surfaces will limit further travel. Furthermore, an assembler of the fitting will be able to sense by feel when the fittings are properly assembled.

The improvement of the present invention can be applied to all couplings of the type disclosed, such as the 12° taper described above as well as the 30° taper fittings, which are also in common use.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic coupling, comprising:
    a female fitting member having a central bore having a central axis, an internal tapered locking surface and external threads parallel to the axis;
    a male fitting member being received within said female member and having a central bore coaxial with the bore of said female member, an external tapered locking surface complementary to said female tapered surface, an annular groove in said male tapered locking surface and an O-ring of deformable material in said groove, said O-ring having a cross-sectional height which is greater than the minimum depth of said groove and extends above said groove, said male fitting member further having a flange portion located immediately behind said external tapered surface and having a diameter greater than the outer diameter of said external tapered surface to define a stop shoulder facing an abutment surface of said female fitting member, said male member further comprising a second shoulder located behind said stop shoulder and facing in a direction opposite to said stop shoulder, said tapered locking surfaces being smooth; and
    a nut member having threads that are parallel to the axis and to the threads of said female member and are connected to the threads of said female member, said nut member provided with abutment means for abutting said second shoulder of said male member to thereby force said tapered surfaces together and deform said O-ring;
    said stop shoulder being in abutment with said female member abutment surface to thereby limit the travel of said male member within said female member and prevent collapse of said male member in the area of its external tapered surface, said male and female members and said nut member being dimensioned such that said tapered locking surfaces abut each other at about the same time as said stop shoulder and female member abutment surface abut each other as said coupling is assembled, there being substantially no further relative movement between said male and female fitting members after abutment of said nut and said second shoulder and abutment of said stop shoulder and said female member abutment surface.

2. The coupling of claim 1 wherein said abutment means on said nut member includes a shoulder in engagement with said second shoulder of said male member.

3. The coupling of claim 2 wherein said tapered surfaces are tapered at an angle of about 12° relative to the axis of said bores.

4. The coupling of claim 1 wherein said tapered surfaces are tapered at an angle of about 12° relative to the axis of said bores.

5. The coupling of claim 1 wherein said tapered surfaces are tapered at an angle of about 30° relative to the axis of said bores.

6. The coupling of claim 1 wherein said tapered surfaces and said second shoulder are dimensioned such that, during assembly of said members, said second shoulder and said abutment surface on said female member are separated by a slight gap when said tapered surfaces just form an interference fit with each other without the application of torque.

7. The coupling of claim 6 wherein said gap is between about 0.005 inches to about 0.100 inches.

* * * * *